(12) United States Patent
Ito et al.

(10) Patent No.: US 12,088,078 B2
(45) Date of Patent: Sep. 10, 2024

(54) WATERPROOF CONSTRUCTION OF THREE-PHASE LINE PART AND THREE-PHASE LINE CONNECTING DEVICE

(71) Applicant: YAZAKI CORPORATION, Tokyo (JP)

(72) Inventors: Yuto Ito, Utsunomiya (JP); Keisuke Sasaki, Utsunomiya (JP)

(73) Assignee: YAZAKI CORPORATION, Tokyo (JP)

( * ) Notice: Subject to any disclaimer, the term of this patent is extended or adjusted under 35 U.S.C. 154(b) by 290 days.

(21) Appl. No.: 17/475,301

(22) Filed: Sep. 14, 2021

(65) Prior Publication Data

US 2022/0085589 A1 Mar. 17, 2022

(30) Foreign Application Priority Data

Sep. 16, 2020 (JP) ................................. 2020-155437

(51) Int. Cl.
| | |
|---|---|
| *H02G 5/06* | (2006.01) |
| *H01B 7/00* | (2006.01) |
| *H01B 7/02* | (2006.01) |
| *H01R 4/02* | (2006.01) |

(Continued)

(52) U.S. Cl.
CPC ........... *H02G 5/061* (2013.01); *H01B 7/0018* (2013.01); *H01B 7/02* (2013.01); *H01R 9/223* (2013.01); *H01R 11/01* (2013.01); *H01R 4/023* (2013.01); *H01R 9/226* (2013.01)

(58) Field of Classification Search
CPC ........ H01R 9/223; H01R 11/01; H01R 9/226; H01R 13/52; H01R 13/5202; H01R 13/5219; H02G 5/061; H01B 7/0018; H01B 7/02
See application file for complete search history.

(56) References Cited

U.S. PATENT DOCUMENTS

| | | | | |
|---|---|---|---|---|
| 5,163,221 | A * | 11/1992 | Favre-Tissot | H01R 43/02 174/94 R |
| 7,128,620 | B2 * | 10/2006 | Maura | H01R 43/0221 219/121.64 |
| 9,302,635 | B2 * | 4/2016 | Han | B60R 16/0215 |

(Continued)

FOREIGN PATENT DOCUMENTS

| | | |
|---|---|---|
| CN | 203480910 U | 3/2014 |
| DE | 20 2009 009 607 U1 | 9/2009 |

(Continued)

*Primary Examiner* — Renee S Luebke
*Assistant Examiner* — Paul D Baillargeon
(74) *Attorney, Agent, or Firm* — KENEALY VAIDYA LLP

(57) ABSTRACT

A waterproof construction of a three-phase line part includes a three-phase line part having three bus bar construction bodies, a first terminal block provided on one end side of the three-phase line part, a second terminal block provided on the other end side of the three-phase line part, and a tubular exterior member that covers a middle portion of the three-phase line part. One end of the tubular exterior member is water-tightly fixed to a first housing of the first terminal block, and the other end thereof is water-tightly fixed to a second housing of the second terminal block, in a state that the tubular exterior member covers the three-phase line part.

5 Claims, 9 Drawing Sheets

(51) Int. Cl.
*H01R 9/22* (2006.01)
*H01R 11/01* (2006.01)

(56) References Cited

U.S. PATENT DOCUMENTS

| | | | |
|---|---|---|---|
| 10,714,848 B2 * | 7/2020 | Kioschis | ................ H01B 9/006 |
| 2013/0199836 A1 | 8/2013 | Adachi et al. | |
| 2015/0274095 A1 | 10/2015 | Inao et al. | |

FOREIGN PATENT DOCUMENTS

| | | | | |
|---|---|---|---|---|
| DE | 202017107503 U1 * | 3/2018 | ........... | H02G 3/0691 |
| EP | 2 610 878 A1 | 7/2013 | | |
| JP | H08-153561 A | 6/1996 | | |
| JP | 2011-113928 A | 6/2011 | | |
| JP | 2012-89771 A | 5/2012 | | |
| JP | 2014-143894 A | 8/2014 | | |
| JP | 2017-168296 A | 9/2017 | | |
| WO | 2012/077826 A1 | 6/2012 | | |

\* cited by examiner

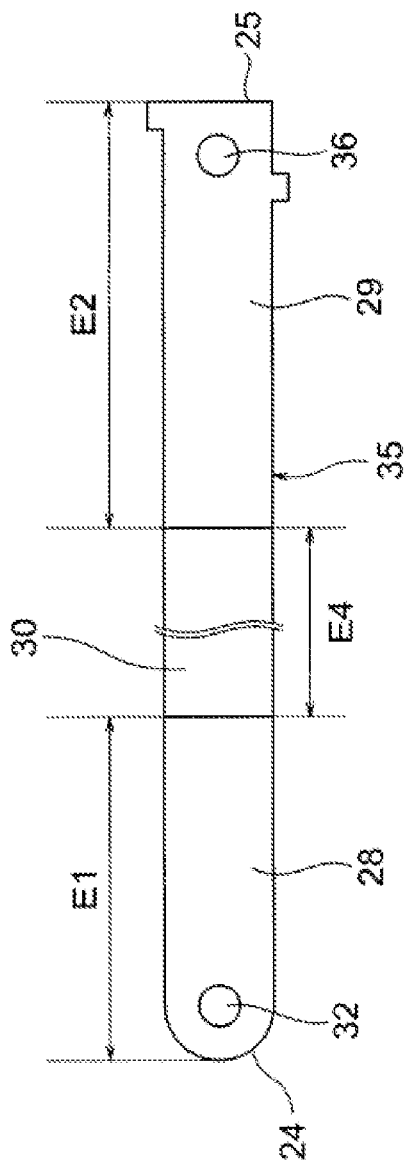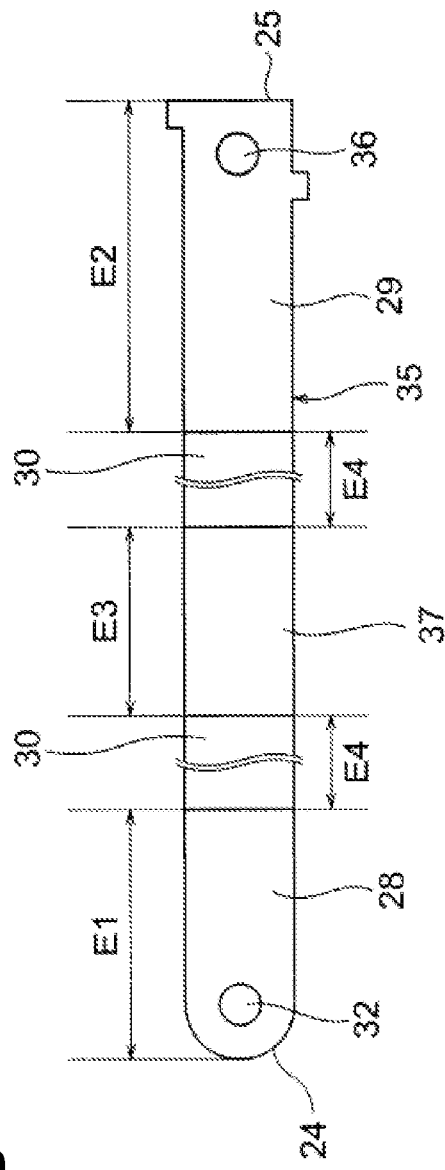
FIG. 8A
FIG. 8B

WATERPROOF CONSTRUCTION OF THREE-PHASE LINE PART AND THREE-PHASE LINE CONNECTING DEVICE

CROSS-REFERENCE TO RELATED APPLICATIONS

This application is based on and claims priority under 35 USC 119 from Japanese Patent Application No. 2020-155437 filed on Sep. 16, 2020, the contents of which are incorporated herein by reference.

TECHNICAL FIELD

The present disclosure relates to a waterproof construction with respect to a three-phase line part (a three-phase line part) in which three bus bar construction bodies are disposed side by side, and a three-phase line connecting device including the three-phase line part and electrically connecting devices.

BACKGROUND ART

For example, JP-A-2012-89771 discloses a three-phase line connecting device including a three-phase line part in which three bus bars are disposed side by side and a cover that covers the three-phase line part and a connecting portion, in order to electrically connect a motor and an inverter mounted on a vehicle.

In the related-art technology, the cover that covers the three-phase line part in which the three bus bars are disposed side by side has a construction that simply covers the three-phase line part, such that when moisture infiltrates into the cover, for example, the moisture infiltrating thereinto may cause a short circuit between the bus bars of the three-phase line part.

SUMMARY

The present disclosure has been made in consideration of the above-described circumstances, and an object thereof is to provide a waterproof construction of a three-phase line part capable of providing a waterproof property and a three-phase line connecting device having this construction.

According to the present disclosure, there is provided a waterproof construction of a three-phase line part includes a three-phase line part having three bus bar construction bodies, a first terminal block provided on one end side of the three-phase line part, a second terminal block provided on the other end side of the three-phase line part, and a tubular exterior member that covers a middle portion of the three-phase line part. One end of the tubular exterior member is water-tightly fixed to a first housing of the first terminal block, and the other end of the tubular exterior member is water-tightly fixed to a second housing of the second terminal block, in a state that the tubular exterior member covers the three-phase line part.

Also, there is also provided a three-phase line connecting device, including: a three-phase line part having three bus bar construction bodies which are disposed side by side; a first terminal block provided on one end side of the three-phase line part; a second terminal block provided on the other end side of the three-phase line part; and a tubular exterior member, one end of which is water-tightly fixed to a first housing of the first terminal block, and the other end of which is water-tightly fixed to a second housing of the second terminal block, in a state where the tubular exterior member covers a middle portion of the three-phase line part.

A waterproof construction of a three-phase line part and a three-phase line connecting device of the present disclosure includes a tubular exterior member that is water-tightly fixed in a state of covering a middle of the three-phase line part, such that an effect of being able to provide a waterproof property can be achieved.

BRIEF DESCRIPTION OF DRAWINGS

FIGS. 8A and 8B are diagrams illustrating a configuration of a bus bar construction body of FIG. 7 and a manufacturing method thereof.

DESCRIPTION OF EMBODIMENTS

A waterproof construction of a three-phase line part and a three-phase line connecting device are configured to include: a three-phase line part in which three bus bar construction bodies are disposed side by side; a first terminal block provided on one end side of the three-phase line part; a second terminal block provided on the other end side of the three-phase line part; and a tubular exterior member that covers a middle of the three-phase line part. One end of the tubular exterior member is water-tightly fixed to a first housing of the first terminal block, and the other end thereof is water-tightly fixed to a second housing of the second terminal block, in a state where the tubular exterior member covers the three-phase line part. The bus bar construction body is configured to include a first rigid part and a second rigid part serving as a connecting portion with a mating terminal, and a flexible part that has flexibility and can perform absorption of a dimensional tolerance.

First Embodiment

Figure 1:
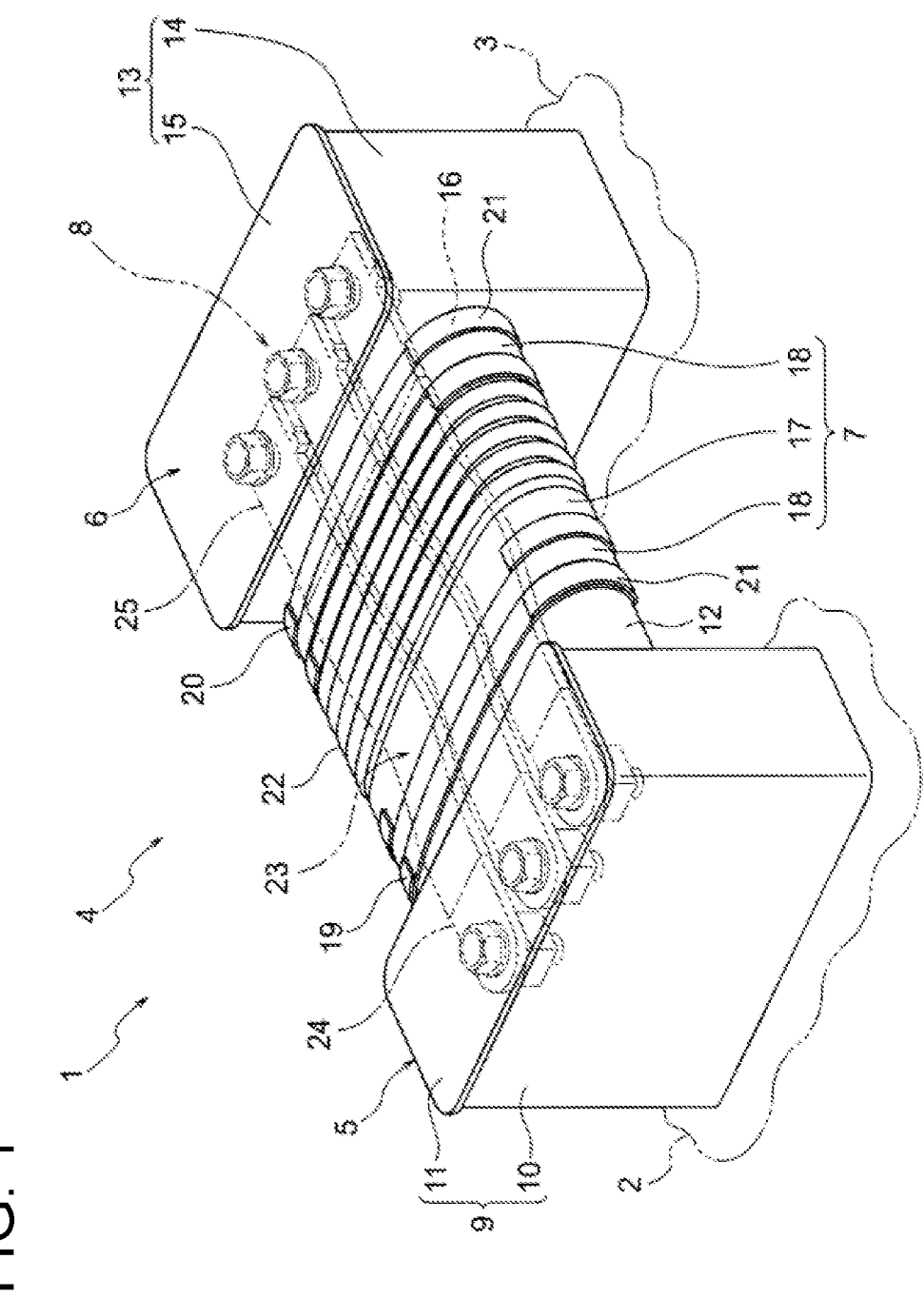
FIG. 1 is a perspective view illustrating an embodiment of a waterproof construction of a three-phase line part and a three-phase line connecting device of the present disclosure.
Figure 2:
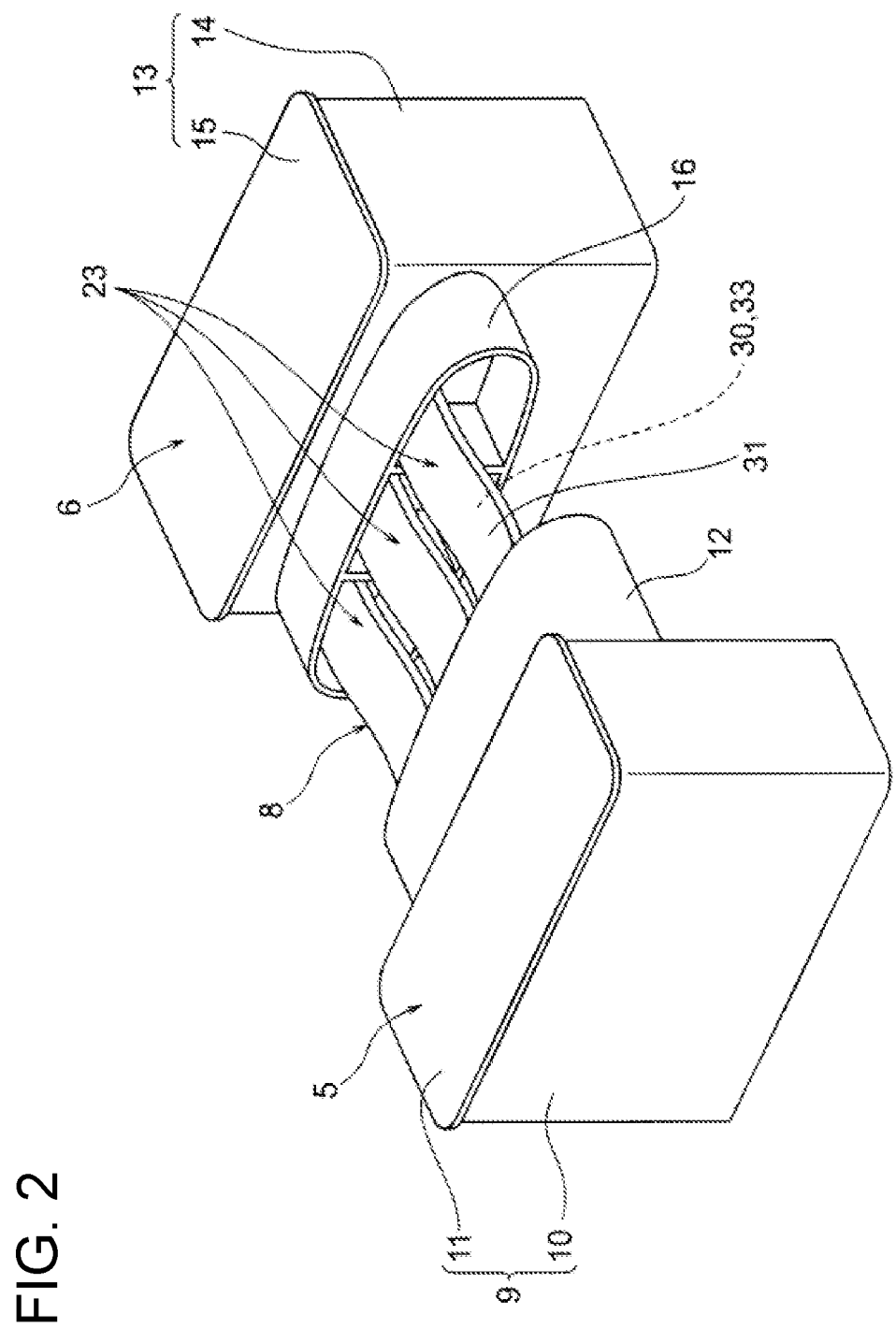
FIG. 2 is a diagram illustrating a state in which a tubular exterior member is not provided with respect to FIG. 1 (a first embodiment).
Figure 3:
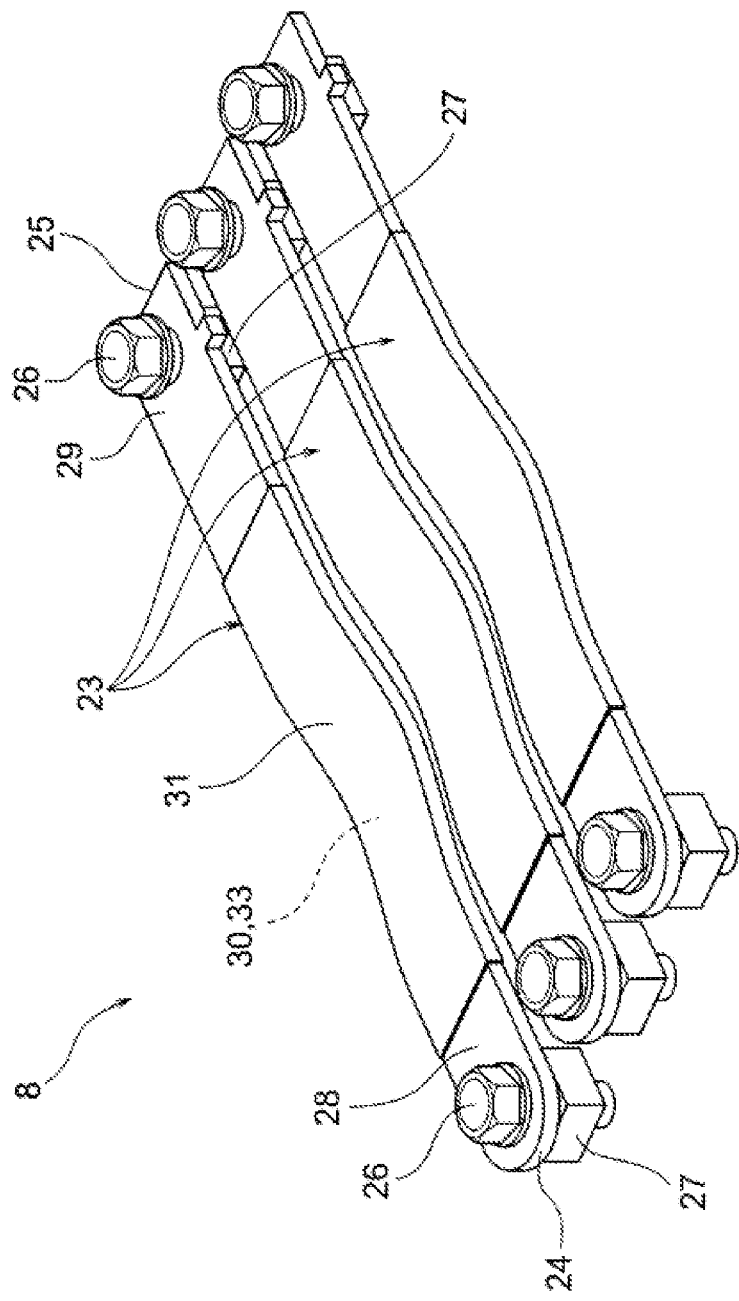
FIG. 3 is a perspective view of the three-phase line part of the first embodiment.
Figure 4:
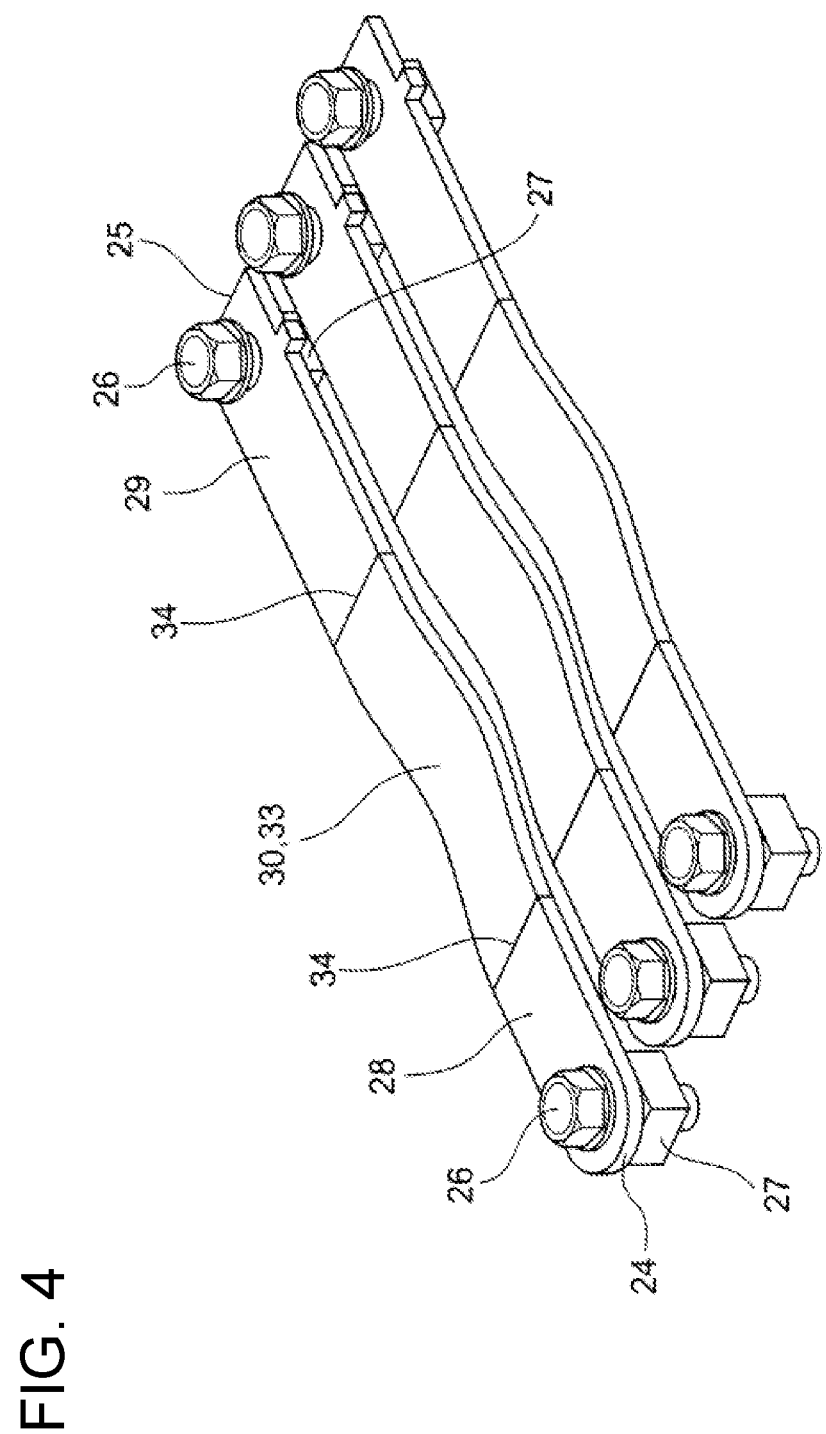
FIG. 4 is a diagram illustrating a configuration of a bus bar construction body of FIG. 3.
Figure 9A:
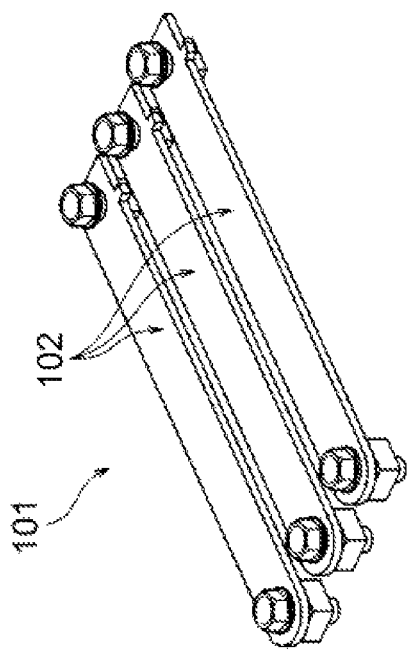
FIGS. 9A and 9B are diagrams illustrating a comparative example.
Figure 9B:
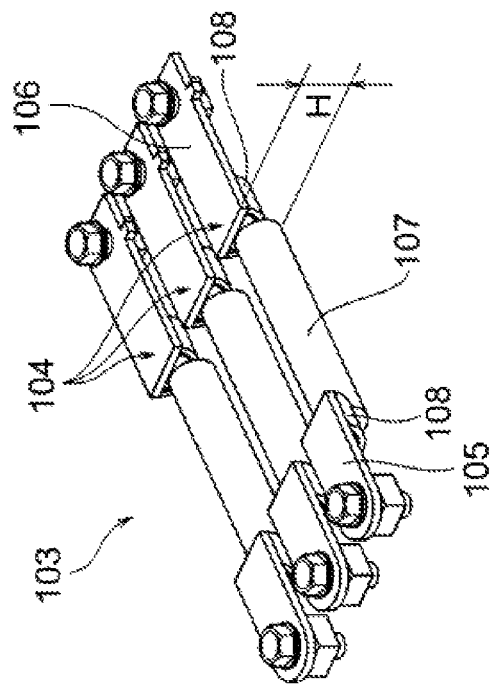

Hereinafter, a first embodiment will be described with reference to the drawings. FIG. 1 is a perspective view illustrating an embodiment of a waterproof construction of a three-phase line part and a three-phase line connecting device of the present disclosure. FIG. 2 is a diagram illustrating a state in which a tubular exterior member is not provided with respect to FIG. 1, FIG. 3 is a perspective view of the three-phase line part, FIG. 4 is a diagram illustrating a configuration of a bus bar construction body of FIG. 3, FIGS. 5A to 5D are diagrams illustrating a manufacturing method of the bus bar construction body of FIG. 3, and FIGS. 9A and 9B are diagrams illustrating a comparative example.

<Regarding a Three-Phase Line Connecting Device 1 and a Waterproof Construction of a Three-Phase Line Part 4>

In FIG. 1, a reference sign 1 indicates a three-phase line connecting device for electrically connecting a first high voltage device 2 (for example, a motor) and a second high voltage device 3 (for example, an inverter) mounted on a vehicle. The three-phase line connecting device 1 is configured so that the device itself includes a waterproof construction of a three-phase line part 4 in order to provide a waterproof property. Specifically, the three-phase line connecting device 1 is configured to include a first terminal block 5, a second terminal block 6, a tubular exterior member 7, and a three-phase line part 8. In the three-phase line connecting device 1 and the waterproof construction of the three-phase line part 4, the first terminal block 5 is disposed on a side of the first high voltage device 2. The second terminal block 6 is disposed on a side of the second high voltage device 3. The tubular exterior member 7 and the three-phase line part 8 are disposed between the first high voltage device 2 and the second high voltage device 3. The tubular exterior member 7 and the three-phase line part 8 adopt those capable of absorbing a dimensional tolerance caused by deviation and relative movement between the first high voltage device 2 and the second high voltage device 3. Hereinafter, each of the configurations will be described.

<Regarding the First Terminal Block 5>

In FIGS. 1 and 2, the first terminal block 5 is a portion serving as a terminal block for the first high voltage device 2 (in other words, a portion serving as a connector), and is configured to include a first housing 9 having an insulation property and three conductive relay terminals (not illustrated) provided in the first housing 9. The configuration and construction illustrated in the drawing are examples. The first terminal block 5 of the embodiment is schematically illustrated for the simplification of description. The first housing 9 is configured to include a housing main body 10 and a lid part 11. The three relay terminals are housed inside the housing main body 10. Although not particularly illustrated, the three relay terminals are electrically connected to the first high voltage device 2. On a side surface of the housing main body 10, an oval cylindrical part 12 communicating with the inside of the housing main body 10 is formed. The oval cylindrical part 12 is formed so that a side of one end 24 of the three-phase line part 8, which will be described later, can be inserted thereinto. The oval cylindrical part 12 is formed so that one end 19 of the tubular exterior member 7, which will be described later, can be fixed to an outer surface thereof. The oval cylindrical part 12 is formed in an oval-shaped cylinder whose diameter in a horizontal direction in the drawing is longer than a diameter in a vertical direction in the drawing. The oval cylindrical part 12 is formed so as to protrude from the side surface at a predetermined length. The housing main body 10 is formed in a shape, the upper part of which is open, so that the one end 24 of the three-phase line part 8 inserted via the oval cylindrical part 12 can be bolted to the three relay terminals. The lid part 11 is provided to cover an upper opening of the housing main body 10 (to cover the upper opening thereof with the lid part 11).

<Regarding the Second Terminal Block 6>

In FIGS. 1 and 2, the second terminal block 6 is a portion serving as a terminal block for the second high voltage device 3 (in other words, a portion serving as a connector), and is configured to include a second housing 13 having an insulation property and three conductive relay terminals (not illustrated) provided in the second housing 13. The configuration and construction illustrated in the drawing are examples. The second terminal block 6 of the embodiment is schematically illustrated for the simplification of description in the same manner as that of the first terminal block 5. The second housing 13 is configured to include a housing main body 14 and a lid part 15. The three relay terminals are housed inside the housing main body 14. Although not particularly illustrated, the three relay terminals are electrically connected to the second high voltage device 3. On a side surface of the housing main body 14, an oval cylindrical part 16 communicating with the inside of the housing main body 14 is formed. The oval cylindrical part 16 is formed so that a side of the other end 25 of the three-phase line part 8, which will be described later, can be inserted thereinto. The oval cylindrical part 16 is formed so that the other end 20 of the tubular exterior member 7, which will be described later, can be fixed to an outer surface thereof. The oval cylindrical part 16 is formed in an oval-shaped cylinder whose diameter in the horizontal direction in the drawing is longer than a diameter in the vertical direction in the drawing. The oval cylindrical part 16 is formed so as to protrude from the side surface at a predetermined length. The housing main body 14 is formed in a shape, the upper part of which is open, so that the other end 25 of the three-phase line part 8 inserted via the oval cylindrical part 16 can be bolted to the three relay terminals. The lid part 15 is provided to cover an upper opening of the housing main body 14 (to cover the upper opening thereof with the lid part 15). Although not particularly limited, the second terminal block 6 of the embodiment is formed so as to be shared with the first terminal block 5.

<Regarding the Tubular Exterior Member 7>

In FIG. 1, the tubular exterior member 7 is provided for the waterproof construction of the three-phase line part 4. The tubular exterior member 7 is configured to include an exterior main body 17 and two band members 18 (it is assumed that this configuration is an example. As long as a waterproof property can be ensured, only the exterior main body 17 may be used). The exterior main body 17 is a molded product formed of rubber or elastomer, and is formed in a cylinder in which the one end 19 and the other end 20 are open in an oval shape. The exterior main body 17 is formed in a cylinder without having a slit, a hole, or the like except that the one end 19 and the other end 20 are open. In the above-described exterior main body 17, a fixing part 21 is formed on a side of the one end 19 and a side of the other end 20, respectively, and an expansion and contraction part 22 is formed in a middle of the three-phase line part 4. The fixing part 21 is inserted into an outer surface of the oval cylindrical part 12 and an outer surface of the oval cylindrical part 16, and formed in a portion tightened and fixed by the band member 18. Although not particularly described with a reference sign, a groove-shaped portion with respect to the band member 18 is formed in the fixing part 21. The expansion and contraction part 22 is formed in a portion, which is expandable and contractible, along an axial direction of the exterior main body 17 (a longitudinal direction of the three-phase line part 8). The expansion and contraction part 22 is formed in a shape of a bellows tube in the embodiment. The expansion and contraction part 22 is formed as a portion that contributes to absorption of a dimensional tolerance caused by deviation and relative movement between the first high voltage device 2 and the second high voltage device 3. The exterior main body 17 as described above may be referred to as a "rubber boot" and a "grommet". As the band member 18, a well-known binding band is adopted in the embodiment (for example, a string, a wire, or the like may be used as an example). In order to have a shielding function, for example, a cylindrical braid may be provided inside the tubular exterior member 7. The tubular exterior member 7 is provided so as to cover the middle of the three-phase line part 8 described below and prevent moisture from infiltrating into the three-phase line part 8.

<Regarding the Three-Phase Line Part 8 of the First Embodiment>

In FIGS. 1 to 3, the three-phase line part 8 is formed by allowing three bus bar construction bodies 23 to be disposed side by side as illustrated in the drawing. All the three bus bar construction bodies 23 forming the three-phase line part 8 are formed to be the same as each other. In FIG. 3, a bolt 26 and a nut 27 provided at the one end 24 and the other end 25 of the three-phase line part 8 are used for connection in the first terminal block 5 and the second terminal block 6, respectively.

<Regarding the Bus Bar Construction Body 23>

In FIGS. 3 and 4, the bus bar construction body 23 is configured to include a first rigid part 28, a second rigid part 29, a flexible part 30, and an insulating cover part 31. The bus bar construction body 23 is not a well-known bus bar alone, but is formed as a band plate-shaped conductive path with the above-described configuration.

The first rigid part 28 is formed as a portion located on the side of the one end 24 of the three-phase line part 8. The first rigid part 28 is a portion electrically connected to a mating terminal in the first terminal block 5, and is formed in, for example, a shape illustrated in the drawing by processing a conductive metal plate in the same manner as a well-known bus bar. The first rigid part 28 is formed in a hard part where deformation does not occur. A bolt insertion hole 32 (refer to FIGS. 5A to 5D) through which the bolt 26 is inserted is formed through the first rigid part 28. The first rigid part 28 is joined to the flexible part 30 (a joining method will be described later with reference to FIGS. 5A to 5D).

The second rigid part 29 is formed as a portion located on the side of the other end 25 of the three-phase line part 8. The second rigid part 29 is a portion electrically connected to a mating terminal in the second terminal block 6, and is formed in, for example, a shape illustrated in the drawing by processing a conductive metal plate in the same manner as a well-known bus bar (the shape of the second rigid part 29 is not limited to the shape illustrated in the drawing, and, for example, may be the same shape as that of the first rigid part 28). The second rigid part 29 is formed in a hard portion where deformation does not occur in the same manner as that of the first rigid part 28. A bolt insertion hole (same as a reference sign 36 in FIGS. 8A and 8B) through which the bolt 26 is inserted is formed through the second rigid part 29. The second rigid part 29 is joined to the flexible part 30.

The flexible part 30 is a portion capable of contributing to absorption of a dimensional tolerance, and has flexibility. The flexible part 30 is formed in a portion where a distance between the first rigid part 28 and the second rigid part 29 is reduced by bending of the flexible part 30, or the distance between the first rigid part 28 and the second rigid part 29 can be maximized by stretching the flexible part 30 in a straight state. As the above-described flexible part 30, a flat braid 33 is adopted in the embodiment. The flat braid 33 is formed by weaving a significantly fine line having conductivity. The flat braid 33 is formed by making the braid flat. The flat braid 33 (the flexible part 30) is formed to have the same width as those of the first rigid part 28 and the second rigid part 29. The flat braid 33 is also formed to have the same thickness as those of the first rigid part 28 and the second rigid part 29. The flat braid 33 (the flexible part 30) is formed to ensure the same conductor cross-sectional area as those of the first rigid part 28 and the second rigid part 29.

Figure 5A:
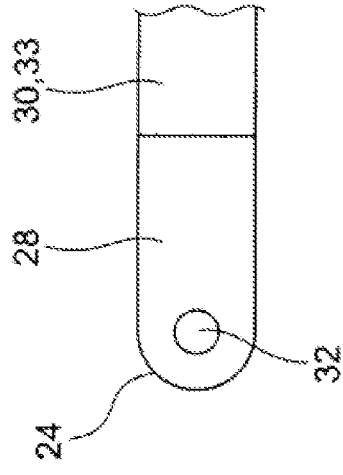
FIGS. 5A to 5D are diagrams illustrating a manufacturing method of the bus bar construction body of FIG. 3.
Figure 5B:
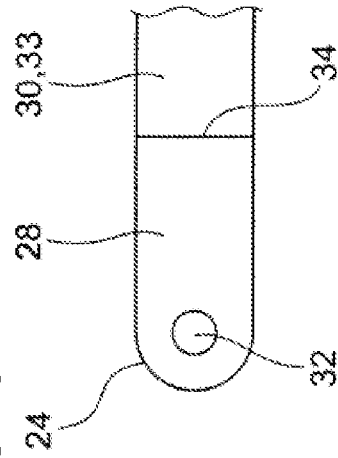
Figure 5C:
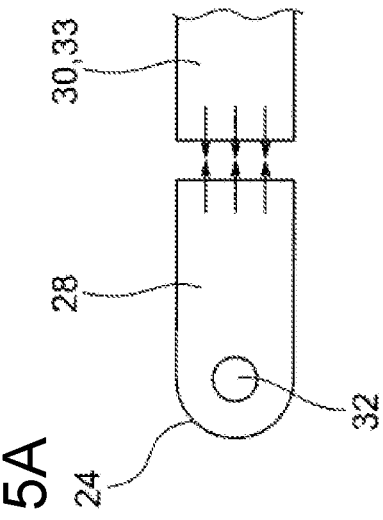
Figure 5D:
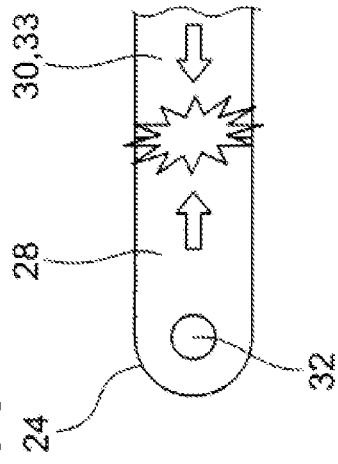

In FIGS. 5A to 5D, in the case of an example in which the flat braid 33 (the flexible part 30) and the first rigid part 28 are joined to each other, the bus bar construction body 23 is formed (manufactured) as follows. That is, as illustrated in FIG. 5A, first, respective end parts (joint surfaces) of the flat braid 33 and the first rigid part 28 are pressed against each other. Next, as illustrated in FIG. 5B, energization heating is performed in a state where the respective end parts (the joint surfaces) are pressed against each other to cause a pressed portion to be easily deformed. After that, as illustrated in FIG. 5C, further pressing is performed thereon to generate metal bonding between the respective end parts (the joint surfaces). At that time, in order to heat the flat braid 33, the flat braid 33 is energized. As a result, the joint part 34 is formed as illustrated in FIG. 5D, thereby forming the bus bar construction body 23 in a state where the flat braid 33 (the flexible part 30) and the first rigid part 28 are joined to each other (however, the state is a state before the insulating cover part 31 is formed. Although not illustrated herein, it is assumed that the second rigid part 29 and the flat braid 33 (the flexible part 30) are also joined to each other in the same manner).

After performing the joining between the flat braid 33 (the flexible part 30) and the first rigid part 28, an insulating tube (including a well-known heat shrinkable tube) or an insulating tape having an insulation property is provided so as to straddle the first rigid part 28 and the second rigid part 29, and covers the flat braid 33 (the flexible part 30), thereby forming the insulating cover part 31.

<Comparison with a Comparative Example>

In FIG. 9A, a three-phase line part 101 as a comparative example is formed by allowing three bus bars 102 to be disposed side by side as illustrated in the drawing. The bus bar 102 is formed by processing a conductive metal plate into a band plate shape. The bus bar 102 is a well-known bus bar itself. The three-phase line part 101 as such a comparative example is difficult to absorb the dimensional tolerance, which is a different point from the three-phase line part 8 (the three-phase line part 8 can absorb the dimensional tolerance).

In FIG. 9B, a three-phase line part 103 as a comparative example is formed by allowing three bus bar construction bodies 104 to be disposed side by side as illustrated in the drawing. The bus bar construction body 104 is configured to include a first rigid part 105, a second rigid part 106, and an electric line 107. A conductor crimping part 108 with respect to a terminal of the electric line 107 is formed in the first rigid part 105 and the second rigid part 106, respectively. The bus bar construction body 104 uses the electric line 107, such that a height H of the three-phase line part 103 becomes high at a crimping portion, which is a different point from the three-phase line part 8 (the three-phase line part 8 can be formed to be thinner than the comparative example and JP-A-2012-89771, such that a space can be saved).

<Effects of the Three-Phase Line Connecting Device 1 and the Waterproof Construction of the Three-Phase Line Part 4>

As described above with reference to FIGS. 1 to 5D and FIGS. 9A to 9B, according to the three-phase line connecting device 1 and the waterproof construction of the three-phase line part 4 of the embodiment of the present disclosure, since the one end 19 and the other end 20 of the tubular exterior member 7 covering the three-phase line part 8 are water-tightly fixed to the first housing 9 of the first terminal block 5 and the second housing 13 of the second terminal block 6, respectively, it is possible not only to prevent moisture from infiltrating into the inside of the tubular exterior member 7, but also to prevent a short circuit of the three-phase line part 8. Therefore, according to the three-phase line connecting device 1 and the waterproof construction of the three-phase line part 4, an effect of being able to provide a waterproof property to the three-phase line part 8 is achieved.

With the three-phase line connecting device 1 and the waterproof construction of the three-phase line part 4, since the exterior main body 17 of the tubular exterior member 7 is fixed to the first housing 9 and the second housing 13 with the band member 18, respectively, the fixed state is good, such that, for example, the tubular exterior member 7 does not fall off, and as a result, an effect of being able to continuously maintain the waterproof property is achieved. In addition thereto, with the three-phase line connecting device 1 and the waterproof construction of the three-phase line part 4, the flexible part 30 is formed in the middle of the bus bar construction body 23, thereby also achieving, by the flexibility of the flexible part 30, an effect of being able to absorb the dimensional tolerance caused by the deviation and the relative movement between the first terminal block 5 and the second terminal block 6 (specifically, between connecting partners). With the three-phase line connecting device 1 and the waterproof construction of the three-phase line part 4, the insulating cover part 31 is provided so as to straddle the first rigid part 28 and the second rigid part 29 and covers the flexible part 30, thereby also achieving an effect of being able to allow the bus bar construction body 23 to provide an insulating portion. As a result, even though the tubular exterior member 7 (the exterior main body 17) is damaged for some reason such that moisture infiltrates thereinto, the short circuit can be prevented.

Second Embodiment

Figure 6:
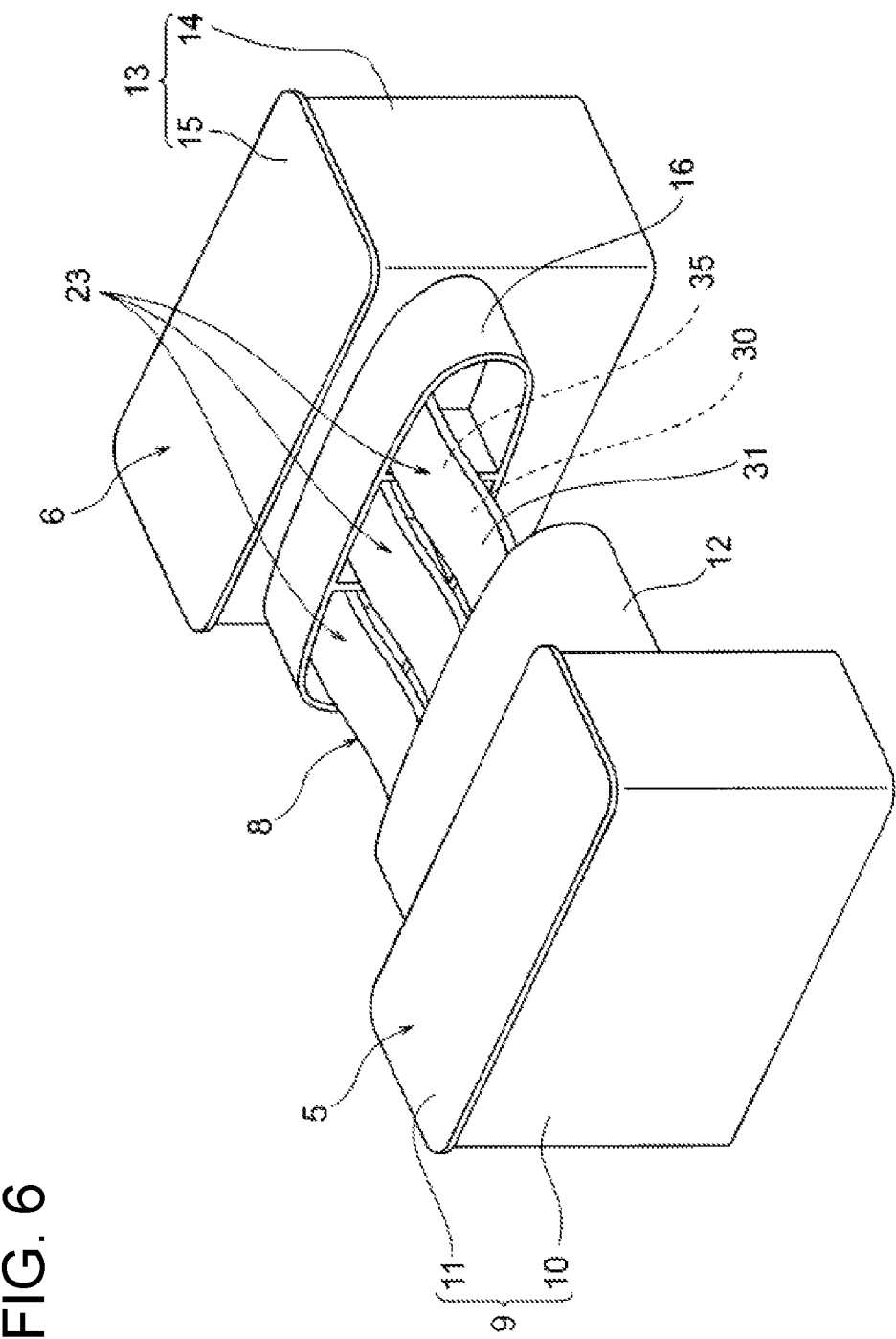
FIG. 6 is a diagram illustrating a state in which the tubular exterior member is not provided with respect to FIG. 1 (a second embodiment).
Figure 7:
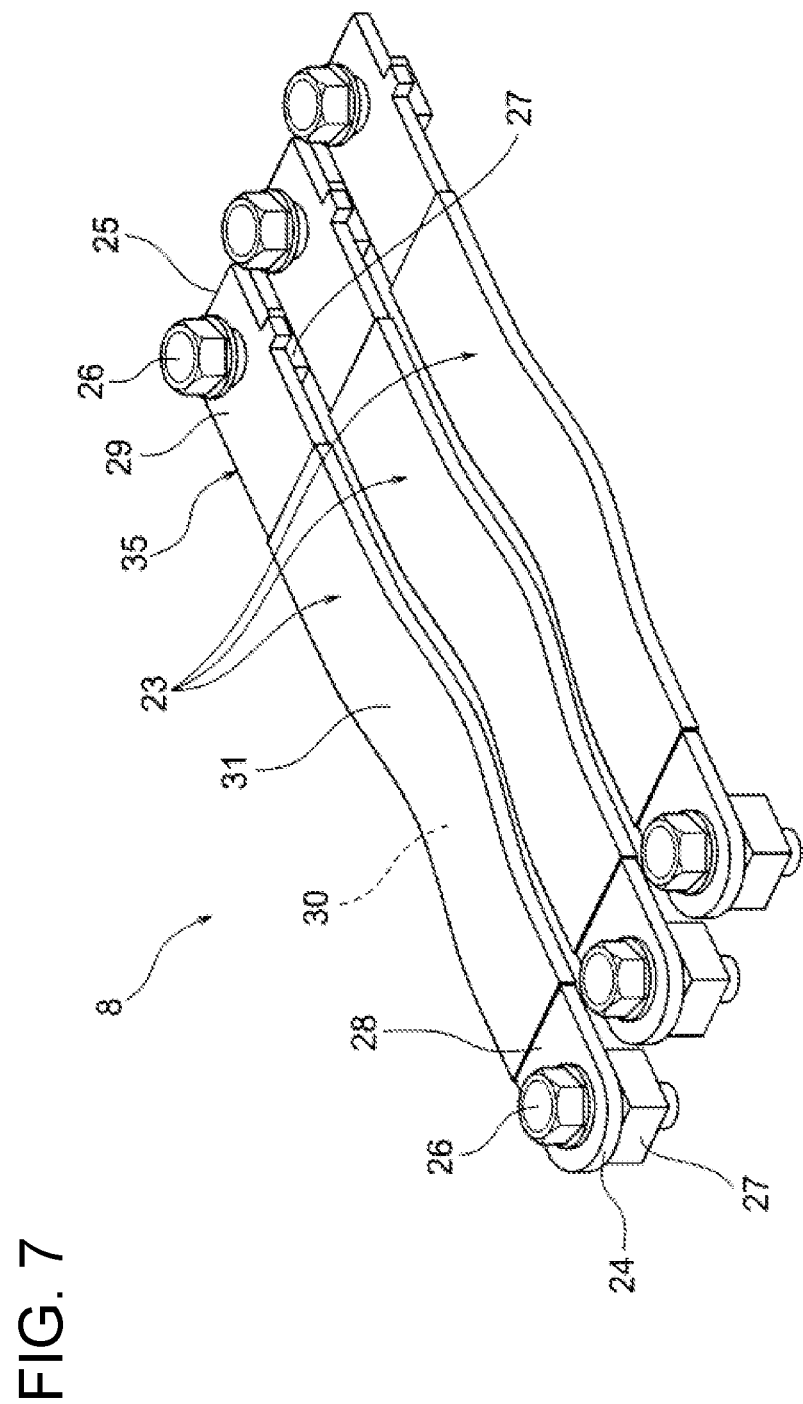
FIG. 7 is a perspective view of a three-phase line part of the second embodiment.

Hereinafter, a second embodiment will be described with reference to the drawings. FIG. 1 is a perspective view illustrating the embodiment of the waterproof construction of the three-phase line part and the three-phase line connecting device of the present disclosure. FIG. 6 is a diagram illustrating a state in which the tubular exterior member is not provided with respect to FIG. 1. FIG. 7 is a perspective view of the three-phase line part, FIGS. 8A and 8B are diagrams illustrating a configuration and a manufacturing method of the bus bar construction body of FIG. 7, and FIGS. 9A and 9B are diagrams illustrating a comparative example. Basically, the same components as those of the first embodiment are denoted by the same reference signs, and detailed description thereof will be omitted.

<Regarding the Three-Phase Line Connecting Device 1 and the Waterproof Construction of the Three-Phase Line Part 4>

In FIG. 1, the three-phase line connecting device 1 of the second embodiment for electrically connecting the first high voltage device 2 and the second high voltage device 3 is configured so that the device itself includes the waterproof construction of the three-phase line part 4 in the same manner as that of the first embodiment. Specifically, the three-phase line connecting device 1 of the second embodiment is configured to include the first terminal block 5, the second terminal block 6, the tubular exterior member 7, and the three-phase line part 8. In the three-phase line connecting device 1 and the waterproof construction of the three-phase line part 4 of the second embodiment, the first terminal block 5 is disposed on the side of the first high voltage device 2 in the same manner as that of the first embodiment. The second terminal block 6 is disposed on the side of the second high voltage device 3. The tubular exterior member 7 and the three-phase line part 8 are disposed between the first high voltage device 2 and the second high voltage device 3. The tubular exterior member 7 and the three-phase line part 8 adopt those capable of absorbing the dimensional tolerance caused by the deviation and the relative movement between the first high voltage device 2 and the second high voltage device 3. The three-phase line connecting device 1 and the waterproof construction of the three-phase line part 4 of the second embodiment is different from those of the first embodiment only in that the constructions of the three-phase line part 8 is different therebetween. Therefore, the construction of the three-phase line part 8 will be described below.

<Regarding the Three-Phase Line Part 8 of the Second Embodiment>

In FIGS. 1, 6, and 7, the three-phase line part 8 is formed by allowing three bus bar construction bodies 23 to be disposed side by side as illustrated in the drawing. All the three bus bar construction bodies 23 forming the three-phase line part 8 are formed to be the same as each other. The bolt 26 and the nut 27 are provided at the one end 24 and the other end 25 of the three-phase line part 8, and are used for connection in the first terminal block 5 and the second terminal block 6, respectively.

<Regarding the Bus Bar Construction Body 23>

In FIGS. 6 and 7, the bus bar construction body 23 of the second embodiment is different from that of the first embodiment. That is, the bus bar construction body 23 is formed of a stacked metal foil 35 in which a large number of metal foils are stacked. The bus bar construction body 23 of the second embodiment is configured to include the first rigid part 28, the second rigid part 29, the flexible part 30, and the insulating cover part 31 in the same manner as that of the first embodiment. The bus bar construction body 23 is not a well-known bus bar alone, but is formed as a band plate-shaped conductive path with the above-described configuration.

The first rigid part 28 is formed as a portion located on the side of the one end 24 of the three-phase line part 8. The first rigid part 28 is a portion electrically connected to a mating terminal in the first terminal block 5, and is formed by welding the metal foils of the stacked metal foil 35 to each other. Specifically, the first rigid part 28 is formed by welding a range E1 of FIGS. 8A and 8B to lump the metal foils together. The first rigid part 28 is formed in a hard portion where deformation does not occur. The bolt insertion hole 32 (refer to FIGS. 8A and 8B) through which the bolt 26 is inserted is formed through the first rigid part 28. The flexible part 30 is disposed next to the first rigid part 28.

The second rigid part 29 is formed as a portion located on the side of the other end 25 of the three-phase line part 8. The second rigid part 29 is a portion electrically connected to a mating terminal in the second terminal block 6, and is formed by welding the metal foils of the stacked metal foil 35 to each other. Specifically, the second rigid part 29 is formed by welding a range E2 of FIGS. 8A and 8B to lump the metal foils together. As illustrated in FIG. 8B, intermediate (a range E3) metal foils in the stacked metal foil 35 may be welded together to form a third rigid part 37. The second rigid part 29 is formed in a hard portion where deformation does not occur in the same manner as that of the first rigid part 28. The bolt insertion hole 36 (refer to FIGS. 8A and 8B) through which the bolt 26 is inserted is formed through the second rigid part 29. The flexible part 30 is disposed next to the second rigid part 29.

The flexible part 30 is a portion capable of contributing to absorption of a dimensional tolerance, and has flexibility. The flexible part 30 is formed in a portion where a distance between the first rigid part 28 and the second rigid part 29 is reduced by bending of the flexible part 30, or the distance between the first rigid part 28 and the second rigid part 29 can be maximized by stretching the flexible part 30 in a straight state. Such a flexible part 30 is formed as a portion in which the stacked metal foil 35 is not welded in the embodiment. That is, a portion of a range E4 in which a large number of metal foils are simply stacked is formed as the flexible part 30. The flexible part 30 is formed to have the same width as those of the first rigid part 28 and the second rigid part 29. The flexible part 30 is also formed to have the same thickness as those of the first rigid part 28 and the second rigid part 29. The flexible part 30 is formed to ensure the same conductor cross-sectional area as those of the first rigid part 28 and the second rigid part 29.

The insulating cover part 31 is a portion for insulation, and is arranged to straddle the first rigid part 28 and the second rigid part 29. The insulating cover part 31 is formed in a portion that covers the flexible part 30. The insulating cover part 31 is formed of an insulating tube (including a heat shrinkable tube) or an insulating tape. The insulating cover part 31 has an insulation property, and is not particularly limited to the above-described configuration as long as the insulating cover part 31 does not damage the flexibility of the flexible part 30 (the same also applies to the first embodiment).

<Comparison with the Comparative Example>

In FIG. 9A, the three-phase line part 101 as a comparative example is formed by allowing three bus bars 102 to be disposed side by side as illustrated in the drawing. The bus bar 102 is formed by processing a conductive metal plate into a band plate shape. The bus bar 102 is a well-known bus bar itself. The three-phase line part 101 as such a comparative example is difficult to absorb the dimensional tolerance, which is a different point from the three-phase line part 8 of the second embodiment (the three-phase line part 8 of the second embodiment can absorb the dimensional tolerance).

In FIG. 9B, a three-phase line part 103 as a comparative example is formed by allowing three bus bar construction bodies 104 to be disposed side by side as illustrated in the drawing. The bus bar construction body 104 is configured to include the first rigid part 105, the second rigid part 106, and the electric line 107. The conductor crimping part 108 with respect to the terminal of the electric line 107 is formed in the first rigid part 105 and the second rigid part 106, respectively. The bus bar construction body 104 uses the electric line 107, such that the height H of the three-phase line part 103 becomes high at the crimping portion, which is a different point from the three-phase line part 8 of the second embodiment (the three-phase line part 8 of the second embodiment can be formed to be thinner than the comparative example and JP-A-2012-89771, such that a space can be saved).

<Effects of the Three-Phase Line Connecting Device 1 and the Waterproof Construction of the Three-Phase Line Part 4 of the Second Embodiment>

As described above with reference to FIG. 1 and FIGS. 5A to 9B, with the three-phase line connecting device 1 and the waterproof construction of the three-phase line part 4 according to the embodiment of the present disclosure, since the one end 19 and the other end 20 of the tubular exterior member 7 covering the three-phase line part 8 are water-tightly fixed to the first housing 9 of the first terminal block 5 and the second housing 13 of the second terminal block 6, respectively, it is possible not only to prevent moisture from infiltrating into the inside of the tubular exterior member 7, but also to prevent a short circuit of the three-phase line part 8. Therefore, with the three-phase line connecting device 1 and the waterproof construction of the three-phase line part 4, an effect of being able to provide a waterproof property to the three-phase line part 8 is achieved.

With the three-phase line connecting device 1 and the waterproof construction of the three-phase line part 4 of the second embodiment, since the exterior main body 17 of the tubular exterior member 7 is fixed to the first housing 9 and the second housing 13 with the band member 18, respectively, the fixed state is good, such that, for example, the tubular exterior member 7 does not fall off, and as a result, an effect of being able to continuously maintain the waterproof property is achieved. In addition thereto, with the three-phase line connecting device 1 and the waterproof construction of the three-phase line part 4 of the second embodiment, the flexible part 30 is formed in the middle of the bus bar construction body 23, thereby also achieving, by the flexibility of the flexible part 30, an effect of being able to absorb the dimensional tolerance caused by the deviation and the relative movement between the first terminal block 5 and the second terminal block 6 (specifically, between connecting partners). With the three-phase line connecting device 1 and the waterproof construction of the three-phase line part 4, the insulating cover part 31 is provided so as to straddle the first rigid part 28 and the second rigid part 29 and covers the flexible part 30, thereby also achieving an effect of being able to allow the bus bar construction body 23 to provide an insulating portion. As a result, even though the tubular exterior member 7 (the exterior main body 17) is damaged for some reason such that moisture infiltrates thereinto, the short circuit can be prevented.

Here, characteristics of the embodiment of the waterproof construction of the three-phase line part and the three-phase line connecting device according to the present disclosure described above are summarized briefly in the following [1] to [7].

[1] A waterproof construction of a three-phase line part, includes:
   a three-phase line part having three bus bar construction bodies which are disposed side by side;
   a first terminal block provided on one end side of the three-phase line part;
   a second terminal block provided on the other end side of the three-phase line part; and
   a tubular exterior member that covers a middle portion of the three-phase line part,
   in which one end of the tubular exterior member is water-tightly fixed to a first housing of the first terminal block, and the other end of the tubular exterior member is water-tightly fixed to a second housing of the second terminal block, in a state that the tubular exterior member covers the three-phase line part.

[2] The waterproof construction of the three-phase line part according to [1],
   in which the tubular exterior member includes an exterior main body that is freely expanded and contracted in a longitudinal direction of the three-phase line part, and band members configured to be fixed to the first housing and the second housing respectively.

[3] The waterproof construction of the three-phase line part according to [1] or [2], in which each of the three bus bar construction bodies has a first rigid part and a second rigid part to be connected to mating terminals respectively at portions located on the one end side and the other end side of the three-phase line part, and a flexible part that has flexibility and can absorb a dimensional tolerance is provided between the first rigid part and the second rigid part.

[4] The waterproof construction of the three-phase line part according to [3],
in which the first rigid part and the second rigid part are formed by a metal plate, and the flexible part is formed of flat braids that are joined together so as to correspond to a thickness of the first rigid part and the second rigid part.

[5] The waterproof construction of the three-phase line part according to [3],
in which each of the three bus bar construction bodies is formed of a stacked metal foil in which a plurality of metal foils are stacked;
in which in each of the first rigid part and the second rigid part, metal foils of the stacked metal foil are welded and joint to each other; and
in which in the flexible part, metal foils of the stacked metal foil are not welded.

[6] The waterproof construction of the three-phase line part according to any one of [3] to [5],
in which each of the three bus bar construction bodies includes an insulating cover part that covers the flexible part and is provided to straddle the first rigid part and the second rigid part.

[7] A three-phase line connecting device, includes:
a three-phase line part having three bus bar construction bodies which are disposed side by side;
a first terminal block provided on one end side of the three-phase line part;
a second terminal block provided on the other end side of the three-phase line part; and
a tubular exterior member, one end of which is water-tightly fixed to a first housing of the first terminal block, and the other end of which is water-tightly fixed to a second housing of the second terminal block, in a state where the tubular exterior member covers a middle portion of the three-phase line part.

It goes without saying that the present disclosure can be modified in various ways within the scope of not changing the gist of the present disclosure.

What is claimed is:

1. A waterproof construction of a three-phase line part, comprising:
a three-phase line part having three bus bar construction bodies which are disposed side by side;
a first terminal block provided on one end side of the three-phase line part;
a second terminal block provided on another end side of the three-phase line part; and
a tubular exterior member that covers a middle portion of the three-phase line part,
wherein one end of the tubular exterior member is water-tightly fixed to a first housing of the first terminal block, and another end of the tubular exterior member is water-tightly fixed to a second housing of the second terminal block, in a state that the tubular exterior member covers the three-phase line part,
wherein the first housing includes a first part that protrudes away from a side of the first housing, the second housing includes a second part that protrudes away from a side of the second housing, and the tubular exterior member is fitted onto an outer surface of the first part and an outer surface of the second part,
wherein each of the three bus bar construction bodies has a first rigid part and a second rigid part to be connected to mating terminals respectively at portions located on the one end side and the another end side of the three-phase line part, and a flexible part that has flexibility and can absorb a dimensional tolerance is provided between the first rigid part and the second rigid part,
wherein the first rigid part and the second rigid part are formed by a metal plate, and the flexible part is formed of flat braids that are joined together,
wherein the flexible part includes a first side end surface and a second side end surface, the first and second side end surfaces face in an extending direction of the flat braids, the first side end surface has a thickness and a width, and the second side end surface has a thickness and a width that is the same as the thickness and the width, respectively, of the first side end surface,
wherein the first rigid part has a third end surface that faces in an extending direction of the flat braids, the third end surface opposes and is joined to the first side end surface, the third end surface has a thickness and a width that are the same as the thickness and the width, respectively, of the first side end surface, and
wherein the second rigid part has a fourth end surface that faces in the extending direction of the flat braids, the fourth end surface opposes and is joined to the second side end surface, and the fourth end surface has a thickness and a width that are the same as the thickness and the width, respectively, of the second side end surface, and
a cross-sectional area of each of the first side end surface, the second side end surface, the third end surface, and the fourth end surface are the same.

2. The waterproof construction of the three-phase line part according to claim 1,
wherein the tubular exterior member includes an exterior main body that is freely expanded and contracted in a longitudinal direction of the three-phase line part, and band members configured to be fixed to the first housing and the second housing respectively.

3. The waterproof construction of the three-phase line part according to claim 1,
wherein each of the three bus bar construction bodies includes an insulating cover part that covers the flexible part and is provided to straddle the first rigid part and the second rigid part.

4. The waterproof construction of the three-phase line part according to claim 1,
wherein the one end of each of the bus bar construction bodies includes a bolt hole, and the bolt hole is located inside of the first terminal block.

5. A three-phase line connecting device, comprising:
a three-phase line part having three bus bar construction bodies which are disposed side by side;
a first terminal block provided on one end side of the three-phase line part;
a second terminal block provided on another end side of the three-phase line part; and
a tubular exterior member, one end of which is water-tightly fixed to a first housing of the first terminal block, and another end of which is water-tightly fixed to a second housing of the second terminal block, in a state where the tubular exterior member covers a middle portion of the three-phase line part, wherein the first housing includes a first part that protrudes away from a side of the first housing, the second housing includes a second part that protrudes away from a side of the second housing, and the tubular exterior member is fitted onto an outer surface of the first part and an outer surface of the second part, wherein each of the three bus bar construction bodies has a first rigid part and a second rigid part to be connected to mating terminals respectively at portions located on the one end side and the another end side of the three-phase line part, and a flexible part that has flexibility and can absorb a dimensional tolerance is provided between the first rigid part and the second rigid part, wherein the first rigid part and the second rigid part are formed by a metal plate, and the flexible part is formed of flat braids that are joined together, wherein the flexible part includes a first side end surface and a second side end surface, the first and second side end surfaces face in an extending direction of the flat braids, the first side end surface has a thickness and a width, and the second side end surface has a thickness and a width that is the same as the thickness and the width, respectively, of the first side end surface, wherein the first rigid part has a third end surface that faces in an extending direction of the flat braids, the third end surface opposes and is joined to the first side end surface, the third end surface has a thickness and a width that are the same as the thickness and the width, respectively, of the first side end surface, wherein the second rigid part has a fourth end surface that faces in the extending direction of the flat braids, the fourth end surface opposes and is joined to the second side end surface, and the fourth end surface has a thickness and a width that are the same as the thickness and the width, respectively, of the second side end surface, and a cross-sectional area of each of the first side end surface, the second side end surface, the third end surface, and the fourth end surface are the same.

* * * * *